April 1, 1941.  E. F. WEBB  2,236,657
POWER TRANSMISSION
Filed June 27, 1939  3 Sheets-Sheet 1

INVENTOR
EDMOND F. WEBB
BY
Harness, Dicke, Patee & Harris
ATTORNEYS.

Patented Apr. 1, 1941

2,236,657

UNITED STATES PATENT OFFICE 2,236,657

POWER TRANSMISSION

Edmond F. Webb, Franklin Village, Mich., assignor to Chrysler Corporation, Highland Park, Mich., a corporation of Delaware Application June 27, 1938, Serial No. 216,003

19 Claims. (Cl. 74—472)

This invention relates to power transmissions and refers more particularly to improvements in speed ratio changing mechanism especially adapted for use in driving motor vehicles.

More particularly, the invention relates to change speed transmissions wherein the speed ratio drive for the vehicle is changed by an improved arrangement of control mechanism.

While the invention is applicable, in the broader aspects thereof, to a variety of speed ratio gearing arrangements to provide speed changes above or below a direct drive from the transmission drive shaft to the vehicle drive shaft, the principles of the invention are illustrated in connection with an overdrive mechanism wherein the driven shaft is at times driven faster than that of the driving shaft.

The advantages of overdrive are well known in the art, especially since overdrive mechanisms have been used commercially in recent years. One type of overdrive, which is well known at this time, comprises a planetary gearing and automatic synchronous centrifugal force clutch control so arranged that when the engine drives in the direct speed ratio, viz. 1 to 1, at or above the critical speed of engagement of the centrifugal clutch, this clutch may be engaged by momentarily reducing the speed of the engine by the amount of the overdrive gear train in order to synchronize the clutch members to establish the overdrive. The clutch is disengaged when the vehicle speed is reduced to some predetermined desired point below its speed corresponding to the critical speed of engagement of the automatically operating clutch.

One disadvantage of the foregoing type of overdrive, in common with other types of overdrives and many change speed devices in general, is that when the vehicle is driven in the fastest speed ratio drive the engine torque is relatively low in comparison with slower speed ratio drives and the engine lacks the desired power for quickly passing another vehicle or for climbing a hill.

It is an object of the invention to provide a change speed mechanism wherein speed ratio drives may be conveniently and quickly changed by the vehicle driver preferably in response to manually operable mechanism such as the usual engine throttle-adjusting accelerator pedal. The mechanism is preferably so arranged that the accelerator pedal may be depressed to overtravel the engine throttle when fully open to thereby manipulate the change speed mechanism for drive in a slower speed ratio, such arrangement being conveniently termed a "kick-down" control. There is preferably employed an accelerator pedal control since the driver ordinarily has his foot on this pedal and naturally depresses the pedal when further power delivery from the engine to the vehicle is desired.

Another object of the invention is to provide a driver controlled change speed mechanism, preferably in the form of a kick-down control, wherein the fastest speed ratio may be an overdrive synchronously controlled by automatic clutch means adapted for operation at a predetermined speed of vehicle travel. With such an arrangement the critical speed of the clutch means may be set relatively low because when the overdrive is in operation there is instantly and conveniently available a control on the change speed mechanism to obtain a slower and more powerful drive so that the benefits of economy, quietness and the like may be obtained by using the overdrive throughout a greater range of vehicle speed than might otherwise be deemed practicable. Obviously, however, the overdrive may be arranged to be operative at any speed desired and may be automatically or manually controlled.

Another object of the invention is to provide an improved electrically controlled prime mover operator for the change speed mechanism preferably acting in conjunction with the kick-down mechanism. The prime mover is preferably of the electrically operated type, such as a solenoid operator by way of example.

A still further object of the invention is to provide an improved mechanism for controlling energization of the electrically controlled or operated prime mover and more particularly to control energization thereof by a driver manipulated control, such as a throttle control.

More specifically, the invention has for its object the provision in a change speed mechanism of the above type including planetary gearing having a control gear, of improved control mechanism for the gearing. The improved control mechanism preferably comprises a control such as a holding means for the control gear of the planetary gearing and an electrically operable prime mover for controlling operation of the holding means.

The electrically operable prime mover is adapted upon energization thereof, in response to manipulation of a driver control, to momentarily interrupt the driving torque to the change speed mechanism for accommodating actuation of the holding means for the planetary control gear through operation of the prime mover.

Other objects of the invention are to provide change speed mechanism automatically operable to provide varying speed ratios best suited to the requirements or conditions of motor vehicle drive. By reason of the invention the vehicle is operated very efficiently without sacrificing rapid accelerating ability.

Further objects and advantages of the invention will be more apparent as the specification progresses, reference being had to the accompanying drawings which illustrate several embodiments of the invention and wherein.

Referring to the drawings, I have illustrated my overdriving mechanism A interposed between a speed ratio changing main transmission B and a driven shaft 25, the latter extending rearwardly to drive the rear wheels (not shown) of the motor car or vehicle in the usual well known manner, it being understood that I have elected to show my invention in association with a motor vehicle drive although in its broader aspects, it is not necessarily limited thereto. The customary propeller shaft brake drum 26 is illustrated as comprising a part of the drive from the overdriving mechanism A to the vehicle.

The driving mechanism may be used to advantage at various other points in the line of general power transmission between the vehicle engine C and the driven wheels, or between driving and driven means such as shafts of other types of devices. In accordance with customary practice the drive from engine C to the main transmission B is controlled by a clutch D of any suitable type, this clutch transmitting the drive to the main transmission by a shaft 27.

The transmission B may be of any suitable type, such as the conventional selector type operated in the well known manner by manipulation of the gear shift lever 28 and the usual selector controls, whereby the various adjustments may be made to the transmission in order to provide forwardly driving speed ratios and a reverse drive through the transmission.

Figures 1, 2, 3, 7:
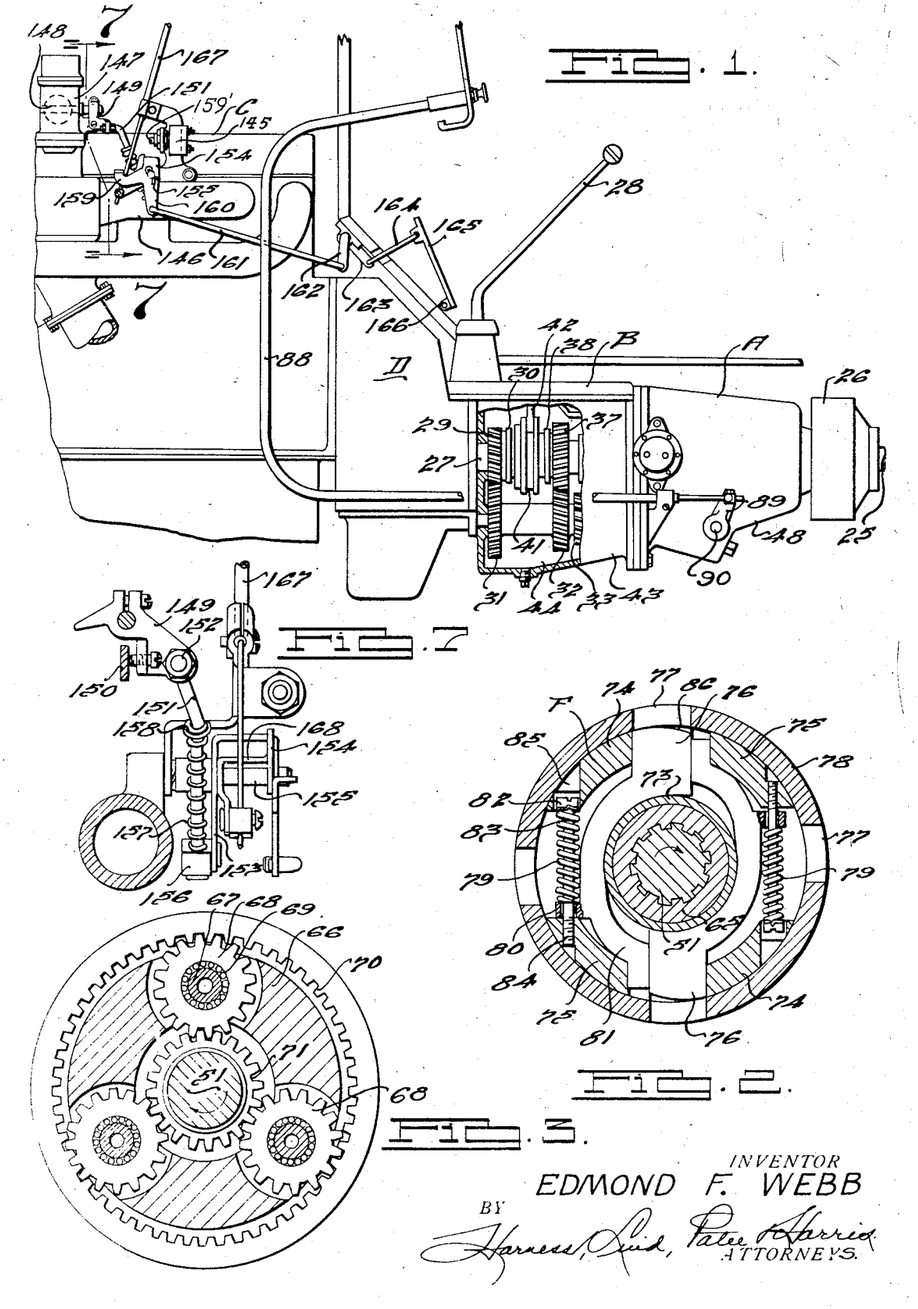
Fig. 1 is a side elevational view, somewhat diagrammatic in form, illustrating the power transmission system as a whole, a portion of the casing of the main speed ratio changing transmission being broken away to illustrate the gearing.
Fig. 2 is a sectional elevational view taken as indicated by the line 2—2 of Fig. 4 illustrating the automatically operating speed responsive clutch forming the primary controlling means for the overdrive gearing mechanism.
Fig. 3 is a sectional elevational view taken as indicated by the line 3—3 of Fig. 4 illustrating the planetary gearing.
Fig. 7 is a view taken as indicated by the line 7—7 of Fig. 1 illustrating a portion of the engine throttle valve adjusting mechanism.
Figure 4:
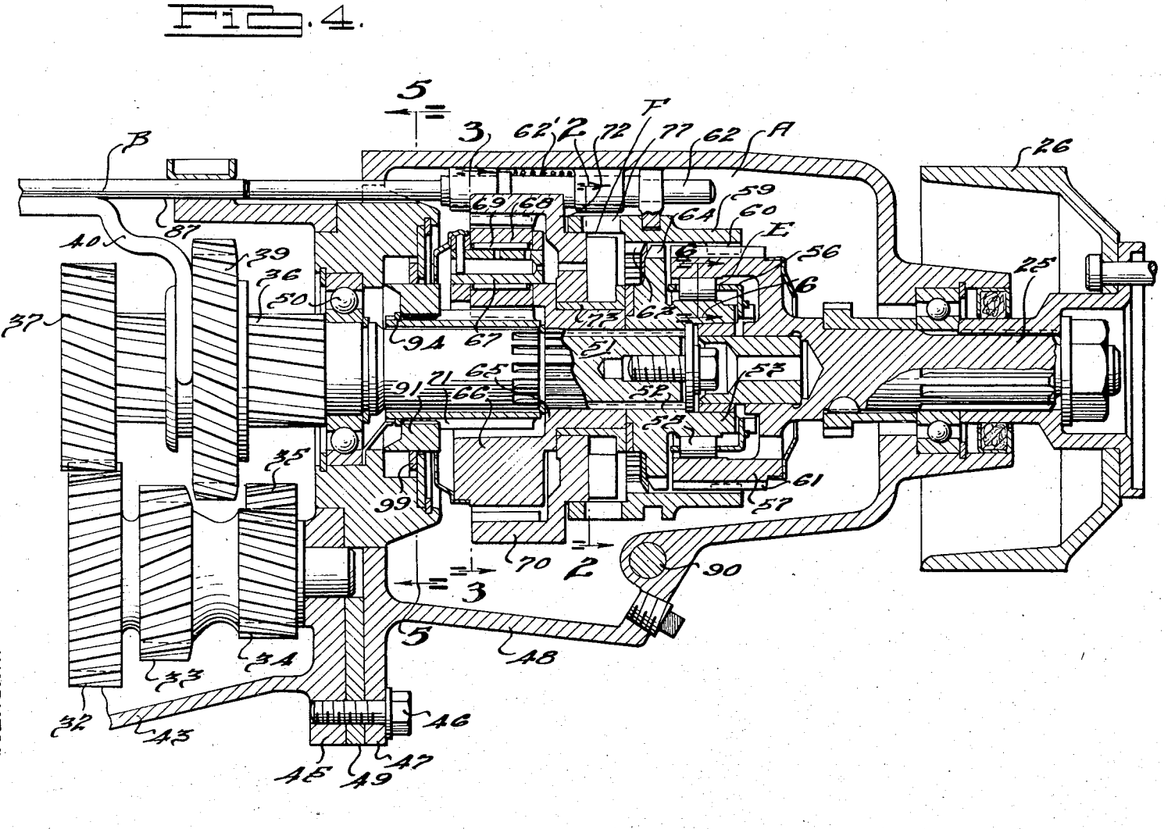
Fig. 4 is a sectional elevational view through the overdrive mechanism and a portion of the main speed ratio changing mechanism.

Inasmuch as the type of transmission illustrated at B is well known in the art, we have shown only a portion of the operating mechanism in Figs. 1 and 4. Shaft 27 carries the countershaft driving pinion 29 and also the direct drive clutch teeth 30, pinion 29 meshing with the driving gear 31 of the countershaft cluster gearing which further includes a second speed drive gear 32, a low speed drive gear 33, and a gear 34 in constant mesh with a reverse idler gear 35. Loosely mounted on the transmission power take-off shaft 36 for rotation relative to this shaft, is the usual second speed gear 37 in constant mesh with the countershaft gear 32, a set of second speed clutch teeth 38 being driven with gear 37.

Splined on the shaft 36 for shifting movement along this shaft is the low and reverse gear 39 shiftable by a fork 40 under control of the gear shift lever 28. When the gear 39 is shifted forwardly into mesh with countershaft gear 33, shaft 36 will be driven from shaft 27 in a forward low speed ratio drive through the gear train 29, 31, 33 and 39. When the gear 39 is shifted rearwardly to mesh with the reverse idler gear 35, shaft 26 will be driven backwards or in reverse relative to the forward direction of rotation of the shaft 27 through the gear train 29, 31, 34, 35 and 39.

In order to selectively drive shaft 36 in the second or intermediate speed ratio, and also in a direct drive, the usual shiftable clutch 41 is provided operable by the fork 42 under control of the gear shift lever 28, this clutch 41 being drivingly connected to the shaft 36 and adapted for selective forward and rearward shifting movements respectively to clutch with the direct drive clutch teeth 30 or the second speed drive clutch teeth 38. During the direct drive, shaft 27 drives the shaft 36 by reason of engagement of clutch teeth 30 with the corresponding teeth of the shiftable clutch 41. During the second speed drive the shaft 36 is driven at a reduction speed ratio greater than that provided by the low speed ratio drive, by reason of the gear train 29, 31, 32, 37, clutch teeth 38, and shiftable clutch member 41.

The main transmission B has the aforesaid gearing disposed within a casing 43 which provides a reservoir or sump 44 for storing a suitable lubricating oil. The transmission casing 43 is formed with a rear annular wall 45 secured by fasteners 46 to the forward wall or flange 47 of the casing 48 for containing the overdriving mechanism A. Secured between walls 45 and 47 there is located an intermediate member 49.

The transmission shaft 36 is the driving shaft for the overdrive mechanism A and is journalled in a bearing 50 carried by the intermediate member 49, the shaft 36 having a rearward driving extension 51 which projects into the overdrive casing 48 and which is formed with splines 52.

Figures 5, 6:
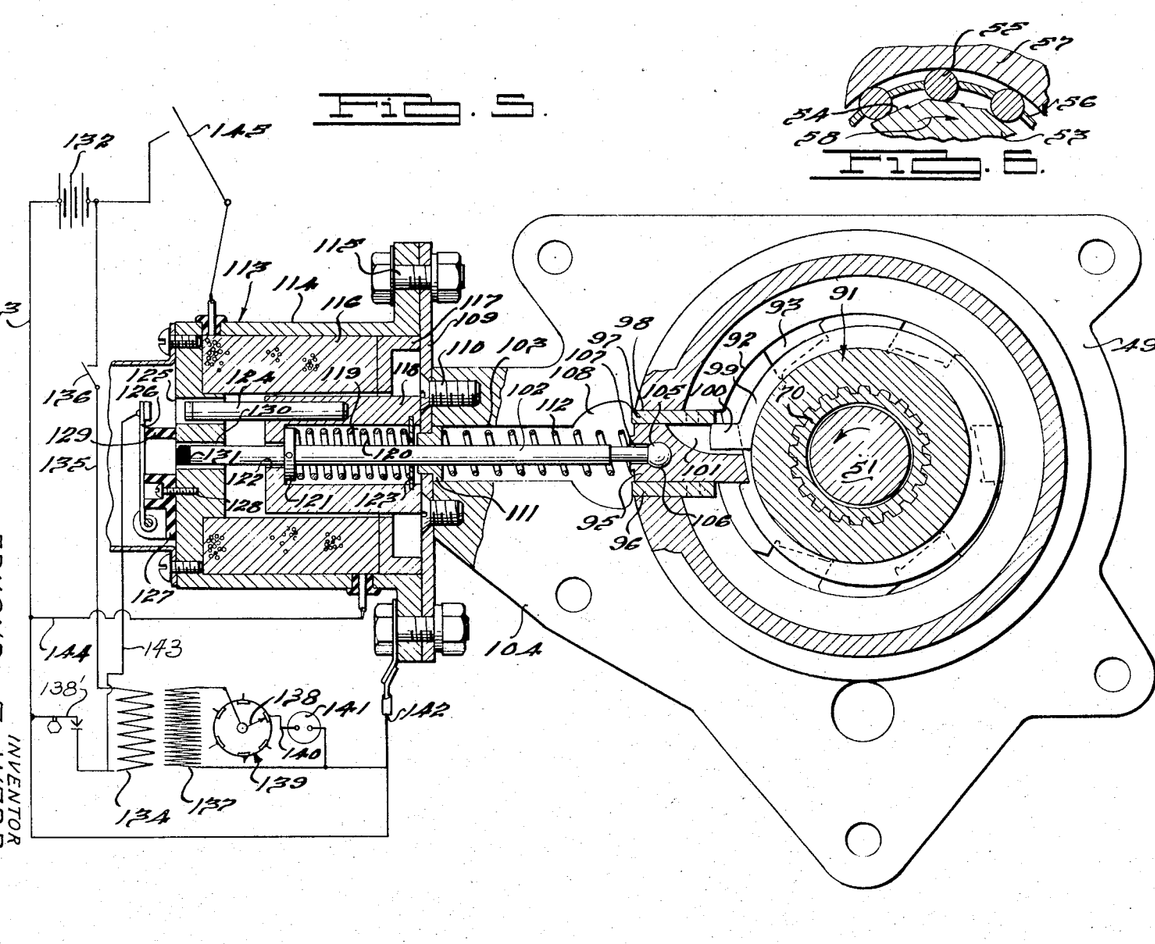
Fig. 5 is a detail sectional elevational view taken as indicated by the line 5—5 of Fig. 4 illustrating a portion of the planetary gearing and showing the electrically controlled prime mover operator therefor, together with a wiring diagram for the latter.
Fig. 6 is a detail fragmentary elevational view taken as indicated by the line 6—6 of Fig. 4 illustrating the overrunning clutch which forms a direct drive releasable connection between the driving and driven shafts of the overdrive mechanism.

Engaging splines 52 at the rear end of driving shaft extension 51, is the inner member 53 of an overrunning clutch E which provides a releasable forward direct driving means from shaft 36 to the driven shaft 25. As best shown in Figs. 4 and 6 the inner member 53 is formed with the usual cam faces 54 engaged by clutching rollers 55, the rollers being spaced by the usual cage 56. The outer member of the overrunning clutch E comprises a cylinder 57 formed as an enlarged forward projection of the driven shaft 25. When the driving shaft 36 has a forward direction of rotation imparted thereto, as indicated by the arrow 58 in Fig. 6, and with the overdriving mechanism inoperative, the rollers 55 will be wedged between the inner and outer member 53 and 57 respectively of the overrunning clutch E so that the driven shaft 25 will be driven in a forward direction with the driving shaft 36. However, in the event that the driving shaft tends to slow down relative to the driven shaft, or in the event that the driven shaft tends to rotate forwardly faster than the driving shaft, the rollers 55 will be released from wedging action and such tendencies of the shafts to rotate relatively to one another will be readily accommodated.

It will be apparent that in order to drive shaft 25 in a reverse direction from the shaft 36, as when the gear 39 is shifted rearwardly to mesh with the reverse idler gear 35 for driving the vehicle in reverse, some means must be provided to render the overrunning clutch E inoperative in order to establish a drive connection between these shafts. In the present embodiment of the invention, this is accomplished by reason of a shiftable clutch sleeve 59 having a set of splined teeth 60 slidably engaging the external splines 61 formed on the cylindrical member 57. The shiftable sleeve 59 is provided with an annular groove adapted to receive a portion of a shifting element 62 which is urged to the left as viewed in Fig. 4 by a coil spring 62'. The sleeve 59 is formed with a set of internal clutch teeth 63 adapted, upon rearward shifting movement of sleeve 59, to engage a second set of clutch teeth 64 conveniently formed as a portion of the overrunning clutch inner member 53 so that the teeth 64 are drivingly connected to the shaft extension 51.

Engaging the splines 52 forwardly of the overrunning clutch member 53, is the cylindrical hub portion 65 of a planet gear carrier 66 mounting a plurality of hollow shafts 67, one of which is illustrated in Fig. 3.

Each shaft 67 journals a planet gear 68 by anti-friction bearings 69. The planet gears 68 are in constant mesh with an internal gear or annulus 70 and also with a sun gear 71 through which the shaft extension 51 passes for rotation relatively thereto. Further details of the construction and operation of the sun gear 71 will be set forth subsequently in connection with the control therefor.

Drivingly carried by the internal gear 70 is a pawl-carrying cage or core 72 of the automatic speed responsive clutch generally designated at F. The cage 72 is rotatably centered on the hub 65 preferably through an intermediate bushing 73.

The automatic clutch F is best illustrated in Fig. 2 wherein it will be noted that the cage 72 is formed with the pairs of diametrically opposite rearwardly extending projections 74 and 75 adapted to slidably guide the centrifugal elements or pawls 76 outwardly for positive synchronous clutching with one of the slots 77 of a companion clutching structure in the form of a cylindrical shell 78 formed as an integral forward extension of the shiftable sleeve 59.

Each pawl 76 is yieldingly urged inwardly or to its retracted declutched position of engagement with the bushing 73 as illustrated in Fig. 2 by a coil spring 79 which acts against the abutment 80 of the pawl counter-balancing yoke portion 81. The other end of each coil spring 79 engages an abutment 82 formed as the head of an adjustable bolt 83 which slidably projects through the abutment 80 for adjustable threaded connection at 84 with a cage projection 75. Each bolt head 82 is accessible for adjustment exteriorly of the automatic clutch by aligning one of the slots 77 with an opening 85 in which the bolt head 82 is disposed, and by rotatably adjusting the bolts 83 it will be apparent that the compression of the coil springs 79 may be varied to change the load upon the pawls 76 and thereby vary the critical speed at which the pawls will fly outwardly under centrifugal force acting thereon for clutching engagement with one of the slots 77. Each pawl 76 has an outer face which is cammed at 86 so that the pawls will jump the slots 77 when the pawls are urged outwardly by centrifugal force prior to synchronizing the speeds of rotation of the cage 72 and the shell 78.

In the operation of the overdriving mechanism A as thus far described, let it be assumed for the moment that the sun gear 71 is held against rotation and that the parts are positioned as illustrated in Fig. 4. The motor vehicle is accelerated from a position of rest by manipulating the main transmission B in the well known manner until, when shiftable clutch 41 is clutched with the direct driving clutch speed 30, the motor vehicle is driven as a direct drive from the engine through the main transmission B and also for a direct drive from shaft 36 through the overrunning clutch E to the driven shaft 25. For purposes of illustration, let it be further assumed that the critical speed of the automatic clutch F is such that the pawls 76 will be held inwardly by the coil springs 79 until the motor vehicle is driven at approximately forty miles per hour, so that when the vehicle is driven at or above this speed the pawls will be urged outwardly but cannot engage the slots 77 by reason of the relatively different speeds of rotation of the cage 72 and shell 78 in conjunction with the cammed pawl faces 86. Thus during this forward direct drive of the motor vehicle, the slots 77 are rotating forwardly at the same speed as that of the driven shaft 25 whereas the pawls 76 together with the cage 72 and internal gear 70 are rotating forwardly at a speed faster than that of the driven shaft by the amount of the overdriving planetary gearing ratio incident to driving the planet cage 66 at the speed of rotation of driving shaft 36 while holding the sun gear 71 relatively stationary.

When the motor vehicle is thus driven at or above the critical speed of operation of the automatic clutch F, the overdrive is brought into operation by a momentary reduction in the speed of the driving shaft 36, accommodated by overrun at the overrunning clutch E, this reduction in speed being conveniently brought about by the vehicle driver releasing or partially releasing the usual accelerator pedal with an accompanying throttle-closing operation at the engine C.

As the speed of rotation of the driving shaft 36 slows down, the pawls 76 will be synchronized with the shell 78 and at such time the pawls will fly outwardly for clutching engagement with one of the slots 77 to thereupon couple shafts 36 and 25 by a two-way drive connection through the planetary gearing.

As hereinbefore noted, this drive connection provides an overdrive from the driving shaft 35 to the driven shaft 25 and the vehicle will be driven from the engine to the planetary gearing, assuming that the sun gear 71 maintains its relatively stationary condition, until the speed of the motor vehicle is reduced appreciably below the aforesaid critical speed of automatic clutch engagement, at which time the coil springs 79 will operate to retract the pawls to the Fig. 2 position thereby releasing the drive through the planetary gearing and restoring the drive through the overrunning clutch E, it being apparent that this clutch will overrun during the aforesaid overdrive. By altering the adjustment of the bolts 83 or by replacing the coil springs 79 with other springs of differing values, it will be apparent that the automatic clutch may be made to function at any desired speed of the motor vehicle.

When it is desired to render the automatic clutch F as well as the overrunning clutch E inoperative, the shiftable sleeve 59 is shifted rearwardly to engage clutch teeth 63 thereof with the driving shaft clutch teeth 64 to thereby directly couple shafts 36 and 25 for a two-way drive therebetween. At the same time the slots 77 will be shifted rearwardly out of radial alignment with the pawls 76 so that the pawls cannot move outwardly to engage the slots coupled with the circumstance that the pawl cage 72 and shell 78 cannot be synchronized with the shafts 36 and 25 coupled for a two-way drive and with the sun gear 71 held stationary. As will presently be more apparent I have provided a secondary controlling means for the overdriving mechanism by reason of which the sun gear 71 may be released at the will of the vehicle driver and since the sun gear 71 takes the reaction of the overdrive, it will be apparent that when the sun gear is allowed to freely rotate the overdrive mechanism will be rendered inoperative even in the event that the automatic clutch F is engaged at the time of release of the sun gear.

I have also provided means responsive to rearward shift of the main transmission gear 39 into mesh with the reverse idler gear 35 for causing a rearward shift of the sleeve 59 to couple shafts 36 and 25 for the aforesaid two-way drive therebetween. The gear 39 is shiftable rearwardly to engage reverse idler gear 35 by a rail 87 to which is connected the yoke 40, the shifting movement of rail being effected by suitable rocking of the shift lever 28 as is well known. As the rail is moved rearwardly it engages the adjacent end portion of the shifting element 62 to move the latter rearwardly against the action of spring 62'. The collar 59 is thus moved rearwardly to engage clutch teeth 63 thereof with the driving shaft clutch teeth 64 to thereby directly couple shafts 36 and 25 for a two way drive therebetween. The rail is maintained in the position to which it has been moved by the conventional ball detent arrangement, not shown, but commonly employed in speed change mechanisms. It will be noted that when the sleeve 59 is so shifted to engage clutch teeth 63 and 64 the slots 77 are shifted out of alignment with pawls 76 and the automatic clutch is rendered inoperative. Upon movement of rail 87 to disengage gears 39 and 34 the sleeve 59 is returned to the position shown by the spring 62'.

If desired, the aforesaid two-way drive between shafts 36 and 25 may be established by means other than that set forth above and the automatic clutch F as well as overrunning clutch E rendered inoperative by shifting the sleeve 59 axially as aforesaid. Such other means may be controlled by the Bowden wire mechanism 88, lever 89 and cross member 90. However, inasmuch as this particular control means has no functional relationship with the control means forming the subject matter of the present invention, details thereof have been omitted for the sake of brevity.

Heretofore in overdrive mechanisms of the foregoing type the sun gear of the planetary gearing has been permanently held against rotation to obtain the necessary reaction for the operation of the planetary overdrive. The additional control means whereby the speed change mechanism may be quickly and conveniently manipulated to establish a slower speed ratio, such arrangement being conveniently termed a "kick-down" control, is shown in conjunction with the sun gear. In this arrangement the sun gear can be released for rotation to thereby release the overdrive and effect a change in the speed ratio drive through a slower drive in the mechanism A.

The releasable holding means for the sun gear preferably comprises a pawl and ratchet arrangement and an electrically controlled prime mover operator, illustrated as a solenoid, therefor. Energization of the solenoid is preferably controlled by a vehicle driver control herein illustrated as the accelerator pedal. The control further embodies means for momentarily interrupting the ignition circuit for the internal combustion engine whereby the driving torque to the change speed mechanism is momentarily interrupted to facilitate release of the holding means.

Referring particularly to Figs. 4 and 5, a collar, indicated generally at 91, is splined on the sun gear 70 and has an annular radially outwardly extending portion 92 provided with a plurality of circumferentially spaced notches 93. The rear face of collar 91 abuts the adjacent end face of the sun gear teeth and is retained in position by a ring 94, as shown in Fig. 4. A retractible pawl 95, slidably mounted intermediate a pair of fixed wear plates 96 and 97 extending through an opening 98 in the intermediate member 49 is adapted to engage a slot 93 for releasably holding the sun gear 70 against rotation. A split ring 99, preferably of spring steel, resiliently grips the outer periphery of the main body of collar 91 to be oscillated thereby as will be presently apparent. The ends of the ring 99 are circumferentially spaced to provide an opening adapted to register with the opening 98 in the part 49 for accommodating engagement of the pawl 95 in a notch 93. One end portion of ring 99 has a radially outwardly extending ear 100 disposed intermediate the plates 96 and 97 and which overlaps a portion of pawl 95 having a reduced thickness as indicated at 101 when the pawl is engaged in a slot for holding the sun gear against rotation. Oscillating movement of ring 99 is limited by engagement of ear 100 with the wear plates 96 and 97.

The pawl 95 is actuated by a rod 102 disposed in an opening 103 in a laterally extending portion 104 of the member 49. The rod 102 has a ball end portion 105 received in a correspondingly shaped socket 106 in pawl 95, the latter having a slot 107 communicating with socket 105 and receiving a portion of rod 102. This arrangement facilitates assembly of rod and pawl and prevents disengagement thereof when the rod is moved axially in retracting the pawl from a slot 93. The opening 103 is enlarged at 108 to accommodate retraction of the pawl.

The rod 102 projects outwardly beyond the portion 104 through an opening in a cover plate 109 fixed by screws 110 to the end face of enlarged portion 104. The wall defining the opening in plate 109 extends radially inwardly beyond the wall defining the opening 103 and provides an abutment for a washer 111. The latter provides an abutment for one end of a coil spring 112 surrounding rod 102, the other end of the spring abutting the pawl 95. The spring 112 yieldably urges the pawl to a position for engagement with a notch 93 and accommodates retraction of the pawl to a position of disengagement from a notch 93.

Operation of the holding means heretofore described for the sun gear of the planetary gearing is controlled by an electrically controlled prime mover motor herein illustrated as a solenoid and generally designated by the numeral 113. The solenoid is contained within a casing 114 having a lateral flange secured to the plate 109 by screws 115. Contained within the casing 114 is the usual solenoid coil 116 spaced from the plate 109 by the spacer 117 having a central opening accommodating the solenoid core 118. The latter has an opening 119 therein through which extends the pawl actuator rod 102 and within which is disposed a coil spring 120 surrounding the rod 102. One end of spring 120 abuts a washer 121 fixedly mounted on rod 102, the washer abutting the adjacent face of the radially inwardly extending portion of the end wall of core 118 which portion has an opening 122. The opposite end of spring 120 seats against an abutment 123 secured to the core 118. The relation of spring 112 to spring 120 is such that when the latter is compressed by movement of core 118 to the left, as indicated in Fig. 5, the built-up energy is sufficient to move the rod 102 and pawl 95 against resistance of spring 112 for retracting the pawl as will be presently apparent.

Carried by and movable with the solenoid core 118 is a metallic rod 124 having a portion thereof projecting axially beyond the adjacent end face of the core and extending into an opening 125 in the end face of casing 114. The rod 124 is adapted upon movement of core 118 in response to energization of the solenoid to engage a contact point on an oscillatable switch blade 126 included in the engine ignition system as hereafter set forth. The switch blade 126 is carried by an insulating mounting 127 secured by screw 128 to casing 114. An insulating leg 129 is carried by blade 126 and engages the end face of the casing 114, it being understood that the blade is yieldably urged to the position shown by suitable means such as a relatively light spring.

The end face of casing has an opening 130 accommodating the free end of rod 102, the latter being provided with an electrically insulated extremity 131 engageable with the switch blade 126 for the purposes hereinafter set forth, it being understood that the rod 124 is adapted upon energization of the solenoid to engage the switch blade contact point prior to engagement of the insulated extremity 131 of pawl actuator rod 102 with the switch blade. As will be presently apparent, the rod is moved to engage the contact point of switch blade 126 for momentarily interrupting the engine ignition circuit, while subsequent engagement of the insulated extremity 131 of rod 124 with the blade reestablishes the circuit. This solenoid core 118 and rod 124 constitute a leader part which, upon energization of the core, moves to interrupt the engine circuit, and during such movement the spring 120 is energized to actuate the rod 102, for releasing the pawl 95, the rod 102 constituting a follower which acts to restore the engine ignition circuit when the pawl 95 is released.

The switch 126 is included in the internal combustion engine ignition system or circuit which may be of any desired type and as herein illustrated includes the usual storage battery 132 having a connector 133 to the primary coil 134 and a return connector 135 in the latter of which is interposed a suitable switch, indicated at 136. The circuit also includes the secondary coil 137 connected with the movable member 138 of the distributor, generally indicated at 139, the latter having a series of stationary contacts connected by circuit wires to a respective spark plug of the internal combustion engine. One such connection is indicated at 140 for the insulated member of the spark plug 141, the opposing member of the spark plug being grounded in the engine as is also the coil 137, as indicated at 142. Connector 143 leads from the connector 133 to switch 126. The solenoid coil 116 is connected to the aforesaid circuit by circuit wire 144, the circuit to the solenoid being controlled by the switch indicated at 145. The make and break switch indicated at 138' operates in timed relation with the movable member 138. That is to say the contact is broken as the member engages a respective contact point and contact is made as the member 138 breaks contact with the aforesaid point.

The switch indicated at 145 is controlled by manipulation of a suitable vehicle driver operable member herein illustrated as the accelerator pedal for the engine throttle control mechanism. Referring to Fig. 1, the engine C is provided with the usual intake manifold 146 to which is conducted the usual gasoline and air mixture from a carburetor 147 under control of a butterfly valve 148 adjustable by a lever 149 so that when the throttle valve is in its wide-open position the lever 149 will engage a stop 150 to prevent further throttle opening movement of lever 149. An operating rod 151 has one end thereof pivotally connected as at 152 to the lever 149 the other end of the rod being operatively connected to a leg 153 of a generally U-shaped member generally indicated at 154 rotatably supported by a rod 155 carried by the engine C. The rod 151 has a swivel connection with a block 156 adapted to move axially of rod 151 against the action of a spring 157 seated against block 156 and abutting a fixed stop 158 carried by rod 151. The spring has sufficient resistance to prevent axial movement of block 156 to effect rotation of lever 149 to move valve 148 to its fully open position at which time the lever engages stop 150.

The other leg of the U-shaped member 154 has a pair of arms 159 and 160 to the latter of which is operatively connected one end of a rod 161, the other end of the latter being connected to an arm 162 of a rotatably supported crank having a second arm 163. The latter arm is connected by means of a rod 164 with an accelerator pedal 165 pivotally supported on the body toe boards 166. Depression of the accelerator pedal operating through the connecting linkage, including rod 164, crank arms 162, 163, rod 161, U-shaped member 154, rod 151 and lever 149, effects opening of the butterfly valve 148. The operating mechanism for the valve is so arranged that the latter is moved to its fully open position prior to the pedal 165 reaching the limit of its travel. When the valve is thus positioned and the lever 149 engages stop 150 further movement of the pedal 165 is permitted by the block 156 moving axially of rod 151 against the action of spring 157. Such further movement of pedal 165 rotates the U-shaped member 154 to cause the arm 159 of the latter to engage the pin 159' to close the switch 145 controlling the electrical circuit to the solenoid 113.

The valve 148 is also provided with the usual manual control including the Bowden wire connection 167 having the usual operating connection to the vehicle dash (not shown). The Bowden wire 167 is operatively connected with a lever 168 carried by rod 155 and adapted to engage the member 154 for rotating the latter as is well known in mechanisms of this type.

In the operation of the change speed ratio mechanism let it be assumed that the holding means heretofore described for the sun gear 70 of the planetary gearing is in the position shown in Fig. 5 and the vehicle is operating at a speed to effect operation of the automatic clutch F to establish the overdrive as aforesaid and the vehicle operator desires to establish a slower speed ratio by means of the "kick-down" control. This is accomplished by moving the accelerator pedal 165 beyond the position at which the throttle valve 148 is in its wide-open position to cause the arm 159 of the U-shaped member 154 to engage the pin 159' to close the switch 145 whereupon the solenoid 113 is energized. Upon energization of the solenoid coil 116 the core 118 thereof is moved to the left as indicated in Fig. 5 and the extremity of pin 124 engages the contact point of switch blade 126 to ground the primary side of the ignition circuit thereby momentarily interrupting the latter. This interruption in turn produces a momentary interruption of the driving torque to shaft 51 thus accommodating withdrawal of the pawl 95 from a respective notch 93.

As the solenoid core 118 is moved to the left as aforesaid, the spring 120 is compressed against fixed abutment 121, it being understood that the spring abutment 123 is moved with core 118. When the driving torque to shaft 51 is momentarily interrupted through action of the pin 124 as aforesaid, the energy built up by compression of spring 120 snaps the pawl actuator rod 102 to the left as indicated in Fig. 5 thereby withdrawing the pawl 95 from a respective notch 93 against the resistance of spring 112. The insulated extremity 131 of rod 102 engages the switch blade 126 to move the latter away from the pin 124 for restoring the engine ignition circuit to normal operation and maintains this condition as long as switch 145 is closed and solenoid 113 is energized.

It will be understood that the foregoing operations occur within a relatively short period of time and that interruption of operation of engine C is only momentary.

Referring now to the blocker ring 99 and the operation thereof in connection with the "kick-down" control, it will be understood that the shaft 51 rotates in a clockwise direction, as indicated by the arrows in Figs. 2 and 3, when viewed from the front and such direction will be used throughout the following description. The Fig. 5 showing is viewed from the rear to better illustrate the relation of the parts and the direction of rotation of shaft 51 being as indicated by the arrow.

When the holding means is in the position shown in Fig. 5, as aforesaid, the planet gears are being revolved in a clockwise direction by rotation of the carrier 65 by shaft 51, and rotate on a respective axis in a similar direction. The tendency therefore is for the sun gear 70 to rotate in clockwise direction and carry with it the blocker ring 99 due to the latter resiliently gripping the collar 91 of the sun gear. Where the pawl 95 is withdrawn from a slot 93 as aforesaid the sun gear is free to rotate in response to its above tendency and the ring 99 is oscillated in a clockwise direction to move the radially extending ear against plate 96 to thereby prevent inward radial movement of the pawl 95 in response to action of spring 112. In this manner a slower speed ratio is established and continued during the time the accelerator pedal is maintained beyond wide-open throttle position to close the solenoid control switch 145. During this operation the automatic clutch F remains operative and after release of the sun gear the planet gears rotate on a respective axis in a counterclockwise direction and impart a clockwise direction of rotation to the sun gear.

When it is desired to reestablish the higher speed ratio by returning the various parts to the position indicated in Fig. 5 whereby the sun gear 70 is again retained against rotation, the accelerator pedal is permitted to move clockwise, as shown in Fig. 1, from the wide open throttle position to open switch 145 thereby deenergizing solenoid 113. While the spring 112 urges the pawl 95 radially inwardly to engage a slot 93, such engagement is prevented by the blocker ring 99 and can occur only by oscillation of the ring to a non-blocking position. This positioning of the ring results from rotation of the sun gear in a counterclockwise direction. To accomplish the latter the accelerator pedal is moved to a position to decelerate the engine C whereby the driven annulus 70 is permitted, through operation of the clutch E to overrun the engine driven shaft 25; that is to say the speed of the driven member 70 as well as that of the shaft 25 exceeds the speed of the driving member, and the driven annulus tends to drive the planet gears. This action is commonly referred to as "coasting" and when the transmission is so operating the planet gears 68 are rotated in a clockwise direction, the sun gear being, of course, free for rotation, the direction thereof being counterclockwise. When the sun gear is so rotated it oscillates the ring 99 in a corresponding direction, the radially extending ear 100 engaging the plate 97 to limit movement. The ring 99 is thus positioned to permit the pawl 95 to engage a slot 93 under action of the spring 112.

It will be apparent that means readily accessible to the vehicle operator is provided for quickly establishing a slower speed drive through the kickdown control. The operation is preferably controlled by the accelerator pedal inasmuch as the latter is the means commonly operated to effect an immediate increase in power transmission. The electrically controlled prime mover operator, herein illustrated as a solenoid, is fully responsive to the control in effecting the momentary interruption of the engine ignition system for accommodating release of the holding means, and for restoring the normal operation of the ignition system following the latter release.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a power transmission for driving a motor vehicle having an internal combustion engine provided with an electrical ignition circuit and a driver manipulated throttle control; a driving shaft adapted to receive drive from the engine and a driven shaft adapted to drive from said driving shaft, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation, means including a solenoid for selectively controlling operation of said holding means, means responsive to manipulation of said throttle control for controlling energization of said solenoid, means operable by said solenoid for momentarily interrupting the electrical ignition circuit, and means responsive to energization of said solenoid for releasing said holding means.

2. In a power transmission for driving a motor vehicle having an internal combustion engine provided with an electrical ignition circuit; a driving shaft adapted to receive drive from the engine and a driven shaft adapted to drive from said driving shaft, planetary gearing operable between said shafts for driving the driven shaft from the driving shaft, braking means for controlling the operation of said planetary gearing, means for controlling operation of said braking means, said means including a solenoid for effecting release of said braking means, means for controlling the energization of said solenoid, and solenoid actuated means for momentarily interrupting operation of said electrical ignition circuit.

3. In a power transmission for driving a motor vehicle having an internal combustion engine provided with an electrical ignition circuit and a driver manipulated throttle control; a driving shaft adapted to receive drive from the engine and a driven shaft adapted to drive from said driving shaft, planetary gearing operable between said shafts for driving the driven shaft from the driving shaft, braking means for controlling the operation of said planetary gearing, means for controlling operation of said braking means, said means including a solenoid for effecting release of said braking means, means for controlling the energization of said solenoid, and solenoid actuated means for momentarily interrupting operation of said electrical ignition circuit, said solenoid actuated means further including a follower member for restoring operation of said electrical ignition circuit.

4. In a power transmission for driving a motor vehicle having an internal combustion engine provided with an electrical ignition circuit and a driver manipulated throttle control; a driving shaft adapted to receive drive from the engine and a driven shaft adapted to drive from said driving shaft, a planetary gearing operable between said shafts for driving the driven shaft from the driving shaft, said gearing including a rotatable control gear adapted to be held from rotation to provide said drive and to be released for rotation to release said drive, said control gear having a slotted portion, holding means for said control gear including a pawl engageable with said slotted portion for holding said gear against rotation, means including a solenoid for disengaging said pawl from the slotted portion of said control gear, and means responsive to manipulation of said throttle control member for controlling energization of said solenoid, said disengaging means further including means operable by said solenoid upon energization thereof for momentarily interrupting operation of the electrical ignition circuit for said engine.

5. In a drive for a motor vehicle having an engine provided with an electrical ignition circuit; vehicle driver operable control means; transmission mechanism operable to provide a drive from the engine to the vehicle, said mechanism including engageable drive control elements adapted when engaged to establish said drive, said elements when engaged being subjected to thrust-transmission therebetween during said drive so as to resist disengagement of said elements to release the drive until said thrust-transmission is relieved; electrically controlled prime-mover operating means adapted to control disengagement of said elements thereby to release said drive; and means operable in response to energization of said prime-mover operating means to control operation of said ignition circuit, said operable means including a leader member operable to momentarily interrupt said ignition circuit for relieving said thrust-transmission and accommodating disengagement of said elements to release said drive and a follower member operable to restore said circuit when said drive is released.

6. In a power transmission for driving a motor vehicle having an internal combustion engine provided with an electrical ignition circuit; a driving shaft adapted to receive drive from the engine and a driven shaft adapted to drive from said driving shaft, planetary gearing operable between said shafts for driving the driven shaft from the driving shaft, braking means for controlling the operation of said planetary gearing, and means for controlling operation of said braking means, said means including a solenoid, a leader member operable by said solenoid for momentarily interrupting said electrical ignition circuit, and follower means energizable in response to solenoid operation of said leader member and operable to restore operation of said electrical ignition circuit.

7. In a drive for a motor vehicle having an engine provided with an ignition circuit; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subjected to thrust-transmission therebetween during said drive so as to resist relative disengagement thereof to release said drive until said thrust-transmission therebetween is relieved; a solenoid for controlling relative operation of said elements, means operable incident to energization of said solenoid for interrupting said ignition circuit to relieve said thrust-transmission, a switch comprising a switch element movable to control restoration of said ignition circuit, a switch operating element movable incident to energization of said solenoid from a position thereof free from engagement with said switch element to a position thereof engaging and moving said movable switch element thereby to effect restoration of said ignition circuit when said drive control elements are relatively disengaged, and a single control member operable by the vehicle driver for controlling energization of said solenoid.

8. In a power transmission for driving a motor vehicle having an internal combustion engine provided with an ignition circuit; driving and driven shafts, planetary gearing operable between said shafts for driving the driven shaft from the driving shaft, said gearing including a rotatable control gear adapted to be held from rotation to provide said drive and to be released for rotation to release said drive, holding means selectively operable to hold said control gear against rotation or to release said control gear for rotation, means for selectively controlling operation of said holding means with respect to said control gear, said means including a solenoid for effecting release of said holding means in response to interruption of said ignition circuit, means operable incident to energization of said solenoid for interrupting said ignition circuit, a switch comprising a switch element movable to control restoration of said ignition circuit, a switch operating element operable in response to energization of said solenoid from a position thereof free from engagement with said switch element to a position thereof engaging and moving said movable switch element thereby to effect restoration of said ignition circuit, and a single driver operable control member for controlling energization of said solenoid.

9. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; a solenoid for controlling relative operation of said elements, a spring energizable in response to operation of said solenoid, a switch comprising a switch element movable to control restoration of said ignition circuit, a switch operating element movable under the influence of said spring from a position thereof free from engagement with said switch element to a position thereof engaging and moving said movable switch element to effect restoration of said ignition circuit when said drive control elements are relatively disengaged, and a control member operable by the vehicle driver for controlling energization of said solenoid.

10. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electromagnetic means including a movable armature for controlling relative operation of said elements, a spring energizable in response to movement of said armature, a switch comprising a switch element movable to control restoration of said ignition circuit, a switch operating member movable under the influence of said spring to move said movable switch element to effect restoration of said ignition circuit when said drive control elements are relatively disengaged, and a control member operable by the vehicle driver for controlling energization of said electro-magnetic means.

11. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electro-magnetic means including a movable armature for controlling relative operation of said control elements, a switch comprising a switch element movable to control restoration of said ignition circuit, a switch operating member movable incident to movement of said armature for moving said movable switch element to effect restoration of said ignition circuit when said control elements are relatively disengaged, and a control member operable by the vehicle driver for controlling energization of said electro-magnetic means.

12. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electro-magnetically operated mechanism for controlling relative operation of said drive control elements including a leader member operable to interrupt operation of said ignition circuit to relieve said thrust-transmission and a follower member operable in response to relief of said thrust-transmission to restore operation of said ignition circuit when said drive control elements are relatively disengaged, and a control member operable by the vehicle driver for controlling energization of said electro-magnetically operated mechanism.

13. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electro-magnetic means for controlling relative disengagement of said elements including an armature operable in response to energization of said electro-magnetic means, switch means operable incident to operation of said armature for interrupting operation of said ignition circuit to relieve said thrust-transmission, an operating member operable incident to relief of said thrust-transmission for effecting relative disengagement of said elements and causing said switch means to restore operation of said ignition circuit, and a control member operable by the vehicle driver for controlling energization of said electro-magnetic means.

14. In a drive for a motor vehicle having an engine; transmission mechanism operable to provide a drive from the engine to the vehicle, said mechanism including positively engageable drive control elements cooperable for relatively engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electro-magnetic means controlling relative disengagement of said elements including an armature operable in response to energization of said electro-magnetic means, switch means controlling operation of said ignition circuit, means operating in response to operation of said armature for effecting operation of said switch means to interrupt said ignition circuit and thereby relieve said thrust-transmission, means operating in response to operation of the last said means for effecting relative disengagement of said elements and operation of said switch means to restore operation of said ignition circuit, and a control member operable by the vehicle driver for controlling energization of said electro-magnetic means.

15. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; means for momentarily interrupting the drive to said elements to relieve said thrust-transmission and to control relative operation of said drive control elements including electro-magnetic mechanism having an armature operable in response to energization of said mechanism, and a spring forming a lost motion connection between said armature and one of said elements loaded in response to operation of said armature and operable to move the last mentioned element out of engagement with the other of said elements in response to relief of said thrust-transmission and to restore the drive subsequent to disengagement of said elements.

16. In a motor vehicle drive, power transmission mechanism including positively engageable drive control elements, at least one of said elements being movable in one direction to engage the other of said elements to establish said drive and being movable in the opposite direction to disengage the other of said elements to release said drive, electro-magnetic means operable to control movement of said movable element in one of said directions comprising an armature operable in response to energization of said electro-magnetic means, and a spring forming a lost motion connection between said armature and said movable element and loaded in response to operation of said armature so as to move said movable element subsequent to armature operation.

17. In a drive for a motor vehicle having an engine; transmission mechanism operable to provide a drive from the engine to the vehicle including positively engageable drive control elements, one of said elements being movable in one direction to engage the other of said elements to establish said drive and being movable in the opposite direction to disengage the other of said elements to release said drive, one of said elements being subject to rotation, said elements being subject to thrust-transmission therebetween during said drive so as to resist relative disengagement thereof to release said drive until said thrust-transmission is relieved; an ignition circuit for said engine adapted to be interrupted to relieve said thrust-transmission; blocker means positionable under the influence of rotation of said rotary element to respectively block and accommodate relative engagement of said elements; a spring operable when loaded to move said movable element into engagement with the other of said elements when said blocker means is positioned to accommodate engagement thereof; a second spring operable when loaded to move said movable element out of engagement with the other of said elements in response to relief of said thrust-transmission, and electro-magnetic mechanism controlling movement of said movable element in one of its said directions of movement under the influence of said springs including an armature operable in response to energization of said mechanism for loading one of said springs.

18. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electro-magnetic mechanism for controlling relative disengagement of said elements including an armature operable in response to energization of said mechanism, and an operating member operable in response to armature operation to interrupt operation of said ignition circuit to thereby relieve said thrust-transmission and accommodate relative disengagement of said elements.

19. In a drive for a motor vehicle having an engine; transmission mechanism operable to provide a drive from the engine to the vehicle, said mechanism including positively engageable drive control elements cooperable for relative engagement therebetween to establish said drive and for relative disengagement therebetween to release said drive, said elements when relatively engaged being subject to thrust-transmission therebetween during said drive so as to resist relative disengagement thereof to release said drive until said thrust-transmission is relieved; an ignition circuit for said engine adapted to be interrupted to relieve said thrust-transmission; electro-magnetic mechanism for controlling relative operation of said elements including an armature operable in response to energization of said mechanism, an operating member operable in response to operation of said armature to interrupt operation of said ignition circuit, and spring means for effecting relative operation of said elements in response to interruption of said ignition circuit.

EDMOND F. WEBB.